United States Patent Office 3,446,165
Patented May 27, 1969

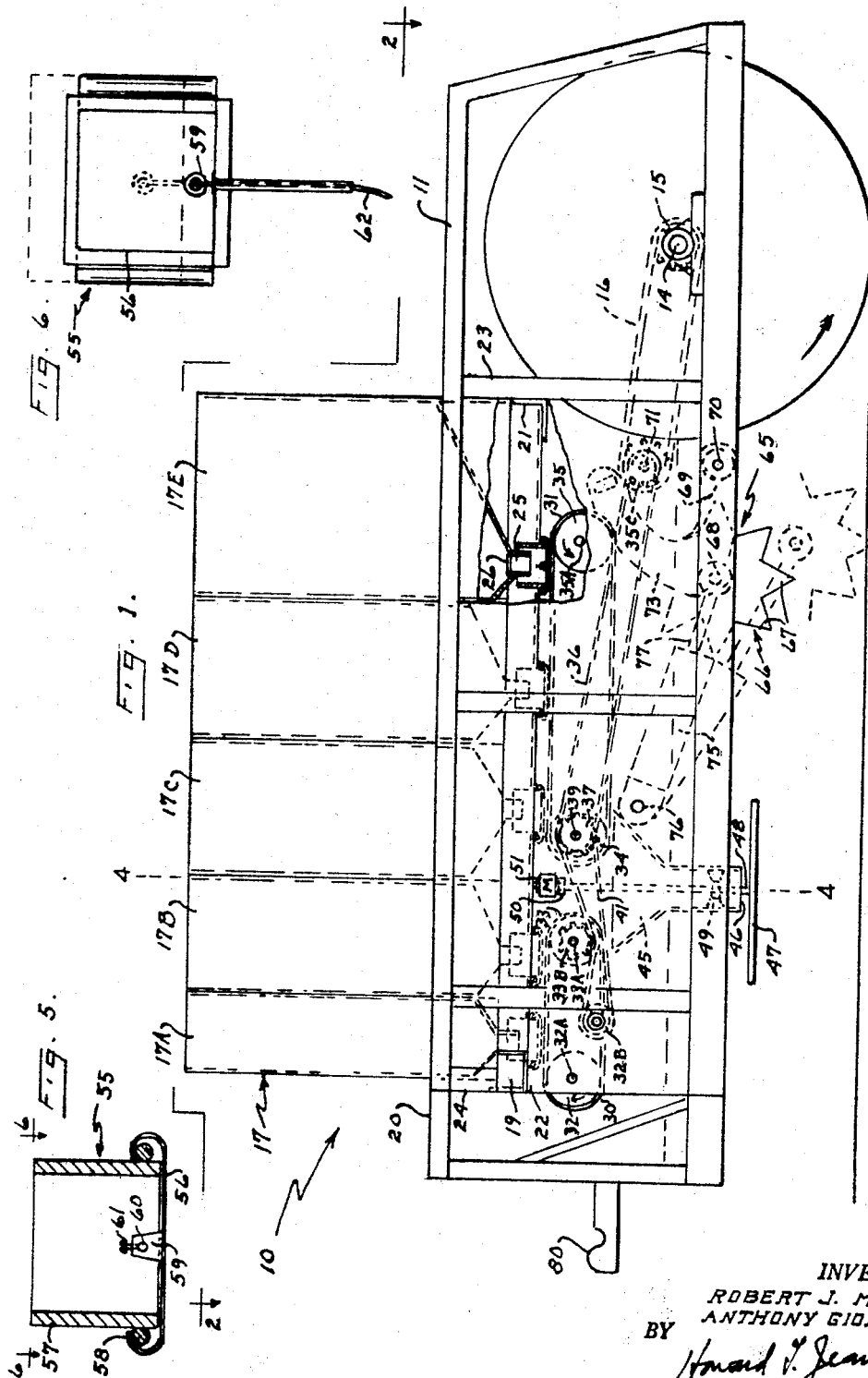

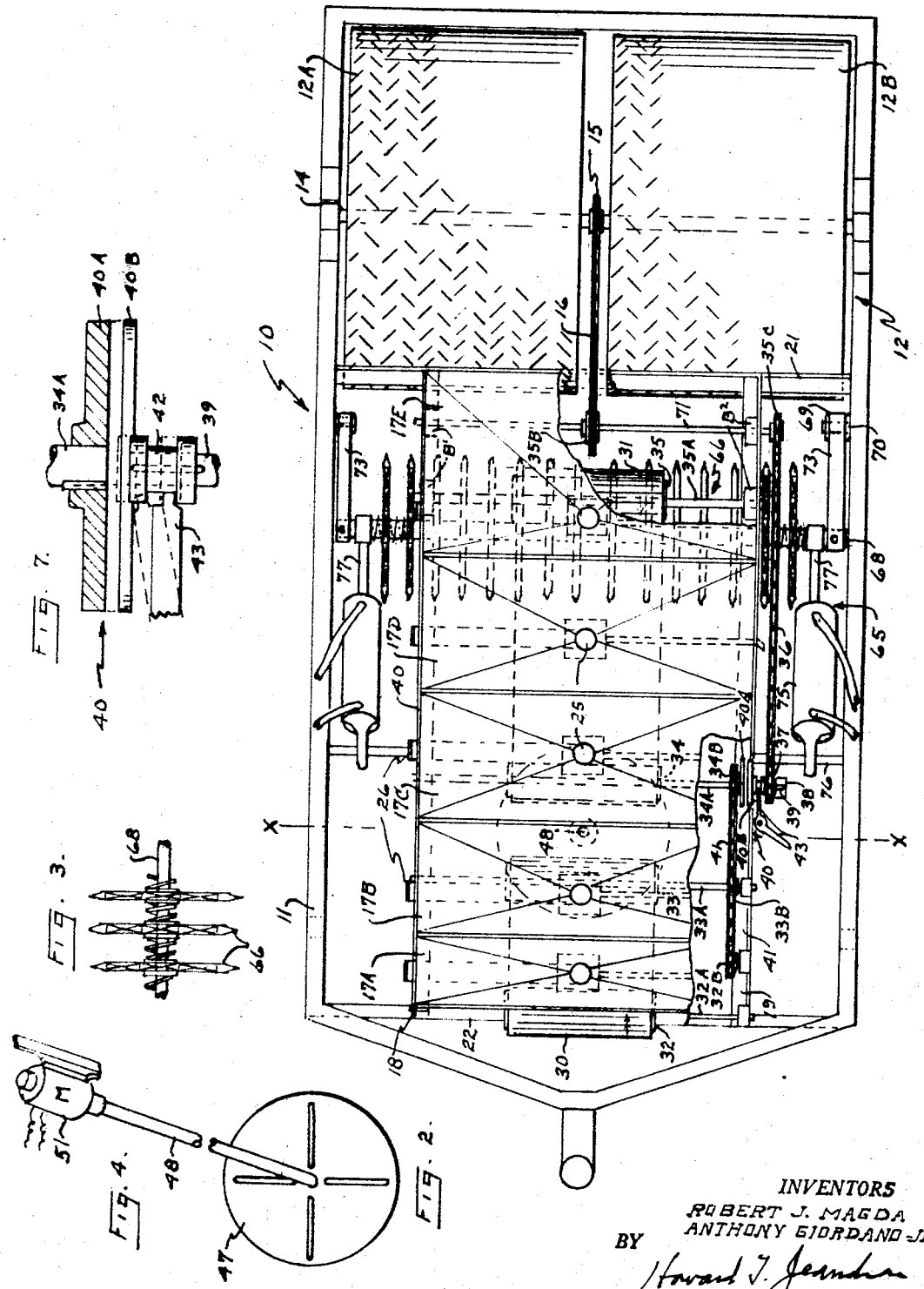

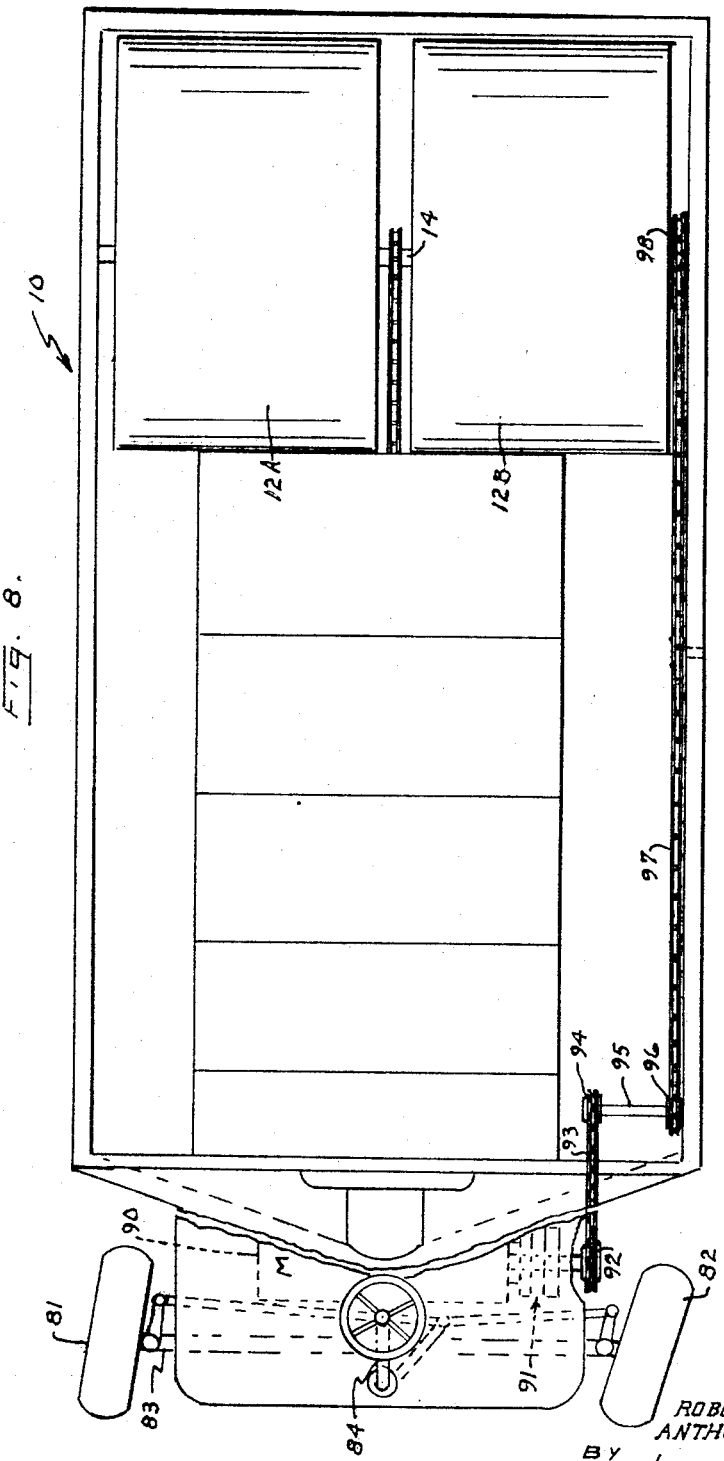

3,446,165
ROLLER CART FOR LAWN TREATMENT
Robert J. Magda, Morganville, and Anthony Giordano, Jr., Colts Neck, N.J., assignors to Auto-Lawn, Inc., Matawan, N.J., a corporation of New Jersey
Filed Oct. 4, 1966, Ser. No. 584,224
Int. Cl. A01c 7/08, 19/00
U.S. Cl. 111—11
5 Claims

ABSTRACT OF THE DISCLOSURE

A lawn treating cart having all the necessary equipment to build and maintain a lawn, namely a plough or rotor-tiller, an aerator, a scarifier, a roller, a plurality of bins for seed, insecticide, fertilizer and a pre-emergent crabgrass control in which each bin is provided with a calibrated gate valve that is remotely controlled by the driver of the cart. The cart is also provided with means to carry the material being poured from any bin or any combination of bins to a single spreader to insure mixing and even spreading. Also the speed of movement of the cart regulates the amount of seed or material spread so that exact quantities can be laid per square foot.

---

This invention relates to a cart that is provided with all of the accessories and supplies needed for the treatment of a lawn, more particularly a roller supported cart with a plurality of storage hoppers for lawn treatment materials.

In the building and upkeep of turf as now found in the average home lawn, or as found in large areas such as a golf course or park, the ground requires preparation in the building of a lawn and maintenance after the lawn has been started. Originally the ground may have been ploughed or was treated with a rotor-tiller to turn over and loosen and break up the top soil. The ground may also have been raked to remove rocks or debris and to give the soil an even or flat surface, or the lawn may be rebuilt from an old neglected lawn. With an old lawn, the surface may simply be aerated by rolling with an elongated shaft having rotatable elements provided with a plurality of spikes that penetrate the surface as it is rolled. The treatment varies according to the original surface to be treated. The equipment necessary to build and maintain turf varies, that is, a plough or rotor-tiller may be necessary but is seldom required except in rare cases. An aerating device is generally used to revitalize or condition old neglected turf. A scarifier is generally used to break up the soil to prepare it as a seed bed. A roller is used for various purposes, to simply pack loosely ploughed and raked soil, or to pack in seed that has been spread, or with a textured roller to pack and leave small impressions that hold the seed or fertilizer and prevent a run off during rain or watering. In the treatment of turf, various lawn materials must be deposited—a spreader is generally used to insure an even dispersion over the turf surface, an insecticide may be spread where needed, a pre-emergent crab grass control may be spread, a fertilizer may be spread and of course various types of seed may be spread to build or maintain a lawn.

The various types of equipment found up to date for lawn care or turf treatment are mostly antiquated or each separate in its function such as the plough or rotor-tiller for turning the ground over, the scarifier for breaking the ground, the roller for compacting the surface of a lawn, the spreader for dispersing fertilizer and the seeder for depositing seed on the lawn surface.

It is an object of this invention to provide a vehicle for the building and care of turf that combines most of the required tools as well as a supply of the required or necessary materials so that operations may be performed singly or in combination and materials may be spread singly or in combination as needed according to the condition of the turf.

A further object of this invention is to provide a vehicle for the building and care of turf in which all of the material used in treating, fertilizing or planting may be stored in separate container hoppers and any one or combination of more than one may be fed for covering the surface to be treated.

A still further object of this invention is to provide a vehicle for the building and care of turf in which all of the material used in treating, fertilizing or planting may be stored in separate container hoppers and each hopper provided with a variable control to regulate the amount of material to be spread.

A still further object of this invention is to provide a vehicle for the building and care of turf in which all of the material used in treating, fertilizing or planting may be stored in separate container hoppers and each hopper provided with a set control to provide the desired amount of each material to be spread.

A further object of this invention is to provide a vehicle for the building and care of turf in which the materials used in the treatment, fertilizing or planting are granular and are stored in separate container hoppers and each hopper is provided with a control to vary or regulate the amount of material to be spread.

Other objects of this invention shall be apparent by reference to the accompanying detailed description and the drawings in which:

FIG. 1 is a side elevational view of the roller cart,
FIG. 2 is a plan view taken on line 2—2 of FIG. 1,
FIG. 3 is a detail of the scarifier,
FIG. 4 is a plan view of the spreader plate taken on line 4—4 of FIG. 1,
FIG. 5 is a side elevational view partially in cross section of the calibrator,
FIG. 6 is a plan view taken on line 6—6 of FIG. 5,
FIG. 7 illustrates a detail of the clutch partly in cross section, and
FIG. 8 is a plan view of a still further embodiment of this invention.

In the treatment of turf and particularly in the average large lawn of the suburban home, an aggregation of equipment is utilized. Simple shovels and rakes are entirely inadequate to cover large areas so the home owner or landscape gardener providing himself with a scarifier, a roller, a planter and fertilizer and due to the weight and size of these devices, invests in a tractor to pull these devices about the lawn, each device being used separately. The average home owner or landscape gardener must also treat the turf with an insecticide and must control the growth of crab grass and must fertilize the soil to build and maintain a good lawn. Due to the fact that many of the preparing or treating operations for turf may be performed either in sequence or in combination, that is an entire scarifying of a lawn may be followed with a fertilizing, each operation being separate or a portion of a lawn may need scarifying and during a fertilizing of the complete lawn, the operation may be stopped when the equipment reaches that particular area to permit scarifying that small area and then continuing with the fertilizing treatment of the entire lawn. This requires changes in the equipment. Therefore the device illustrated in FIGS. 1 and 2 has been developed to include all of the necessary equipment and materials in a single vehicle for turf or lawn care. Referring to FIGS. 1 and 2 there is illustrated a roller cart 10, the roller cart 10 provided with a chassis or frame 11 that supports all of the equipment included in the roller cart. The chassis 11 is, at one end, mounted upon a roller 12. Roller 12 is in fact two rollers 12A and 12B mounted on a single shaft 14. Rollers 12A and 12B are separated at the center of the vehicle to permit mounting a sprocket 15 that is utilized in operating other equipment on the vehicle. The chassis 11 also supports a plurality of hopper shaped containers 17 that is, there are a plurality of hoppers 17A, 17B, 17C, 17D and 17E in this particular vehicle although there may be more or less in other variations of this vehicle. The hoppers 17 are supported on either side of chassis 11 by a pair of angle irons 18 and 19 which are mounted slightly below the upper frame 20 of chassis 11 so that the upper frame 20 retains hoppers 17 in their upright position as illustrated in FIG. 1. The angle irons 18 and 19 are mounted upon cross frame elements 21 and 22 which are in turn supported by upright elements 23 and 24. Each hopper 17 is provided with a single spout 25 for the spilling or emptying of the contents of the container in its inverted position as illustrated in FIG. 1. It is to be noted that the walls of the containers 17 are inclined in a funnel shape at the lower end to insure a complete spilling or dumping of the contents through the spout 25. A gate or shut off 26 is provided across the throat of each spout 25 to permit closing or opening the hopper to the degree desired. Also mounted in chassis 11 are a pair of belts 30 and 31. In this particular model two belts are sufficient for the necessary spilling and spreading of the granular material carried in the hoppers 17. Belt 30 is mounted about a pair of rollers 32 and 33 and positioned directly under hoppers 17A and 17B so that the spout 25 of each of these hoppers will spill the granular material first into the calibrator and in turn the calibrator will deposit the desired amount directly upon the conveyor belt 30. While conveyor belt 31 is mounted about a pair of rollers 34 and 35, and the belt 31 is also mounted directly under the spouts 25 of hoppers 17C, D and E so that the spout 25 of each of these hoppers will spill the granular material first into the calibrator and in turn the calibrator will deposit the desired amount directly upon the conveyor belt 31. It is to be noted that rollers 32, 33, 34, 35 are mounted upon shafts 32A, 33A, 34A, 35A respectively and these shafts are mounted in bearings B1–B2 on either side, the bearings in turn being supported on angle irons 18 and 19. It is to be further noted that belts 30 and 31 are spaced slightly apart form an axis XX that is approximately the division of hoppers 17B and 17C and a funnel shaped hopper 45 is mounted directly under this area, hopper 45 being provided with an open throat 46 at its lower end. Belts 30 and 31 are driven in opposite directions by a drive to be described later so that belt 30 will rotate clockwise while belt 31 rotates counter-clockwise. Thus the granular material that is deposited upon both belts will be carried toward the axis XX to be dropped or dumped into hopper 45 to be spilled out of the throat 46. To provide an even spreading or dispersion of the granular material falling out of throat 46, there is provided a spinner plate 47 (FIG. 4) directly below the open throat 46. The spinner plate 47 must be rotated to throw the granular material outward by centrifugal force to provide a spreading of the granular material in a pattern or width of dispersion in relation to the vehicle. Spinner plate 47 is therefore mounted upon a shaft 48, shaft 48 is rotatably mounted in the center of spout 45 (FIG. 1) by means of bearings 49 and 50. Shaft 48 extends above bearing 50 and is affixed to an electric motor 51. Thus by connecting motor 51 to a potential such as a battery or magneto (not shown), motor 51 may be operated to rotate shaft 48 and thus spin plate 47 at a sufficient r.p.m. to provide the desired spreading of the granular material that is spilled through hopper 45. In the dumping or spilling of the granular material from each of the hoppers 17A through 17E, it is necessary to provide either a predetermined aperture opening for the spout to determine the exact amount of granular material spilled in relation to the area of ground or lawn traversed by roller 12 or a variable gate or a calibrated gate 55 must be provided under the spout 25 to control the exact amount of granular material desired with relation to the area traversed by roller 12.

Referring to FIGS. 5 and 6 there is illustrated a variable or calibrating gate 55 for controlling the amount of the granular material that is to be deposited upon the belts 30 or 31 as the case may be. The calibrator 55, formed similar to a square flue or pipe 57, has an open top and open bottom, and a gate or slide plate 56 is mounted to completely cover the open bottom of the flue or pipe 57 but is slideable to uncover any degree from completely closed to completely open pipe 57. In this embodiment the calibrator 55 is formed with a pair of guiding rails 58 affixed to either side of the calibrator 55 and the gate or slide plate 56 is mounted in juxtaposition to the bottom surface of pipe 57 but is curved inward at either end to bear upon the surface of the guide rails 58. Thus plate 56 is easily movable along the guide rails 58 to open or close the open throat of pipe 57. A raised portion 59 is affixed to plate 56 adjacent one edge thereof and portion 59 is provided with a small aperture 60 and a set screw 61 mounted through portion 59 to bear upon a wire 62 inserted in the aperture 60. Thus by using a push-pull cable 63, the inner wire 62 of the cable may be fixed in aperture 60 and the push-pull cable extended to a desired position for the operator of the vehicle so that by pulling the wire, plate 56 may be closed, by pushing the wire, plate 56 may be opened as illustrated in FIG. 6. And of course the wire may be provided with a plurality of predetermined positions (not shown) to provide a metered or exact amount of opening for each position to control the amount of material deposited by the calibrator upon the belt. It is to be noted that the calibrator must be set close to the surface of the belt with a predetermined clearance so that the amount of granular material flowing from the calibrator is directly proportional to the speed or movement of the belt and the setting of the calibrator, increasing this clearance increases the amount of granular material deposited upon the belt and decreasing this clearance decreases the amount deposited. In order to show the relationship between the amount of granular material being dumped upon belts 30 or 31 with relation to the area traversed by roller 12, there is provided a drive of the belts by roller 12. As already described, roller 12 is mounted on a shaft 14 that is provided with a sprocket 15 at its center. Sprocket 15 is connected by a chain 16 to a sprocket 35B that is affixed to shaft 71. Thus there will be a one to one relationship between sprocket 35B and sprocket 15 to predetermine the movement of belt 31 with relation to the ground traversed by roller 12. Sprocket 35B through shaft 71 will drive sprocket 35C in a counter-clockwise direction as indicated, as roller 12 is pulled or moved forward to rotate counter-clockwise. Sprocket 35C will in turn drive a chain 36 in the same direction. Chain 36 extends from sprocket 35C to another sprocket 37, which is mounted upon and affixed to a stub shaft 39 to thus drive one side 40B of a clutch 40. Clutch 40 is moved into and out of engagement by shifting plate 40B into and out of engagement with the surface of plate 40A. A yoke attached to plate 40B and keyed to be slideable upon stub shaft 39 permits the necessary shifting of plate 40B. Yoke 42 may be moved into and out of engaging position by a lever 43, lever 43 being positioned in an easily accessible position for the operator to either directly or remotely operate the clutch 40. With plate 40A mounted and affixed to shaft 34A the clutch 40 may be moved to an engaged position, shaft 34A will be driven and roller 34 will be driven counter-clockwise thus driving belt 31. To drive belt 30, sprocket 34B mounted and affixed to shaft 34A is utilized, chain 41 passing from sprocket 34B under a driving sprocket 33B and extending to pass over an idler sprocket 32B. Thus with sprocket 33B affixed to shaft 33A, sprocket 33B will be driven clockwise and therefore belt 30 will be driven in a clockwise direction.

Referring to FIG. 1 there is also illustrated a scarifying or aerating device 65. The scarifier 65 is comprised of a plurality of rotatable elements 66 that may be provided with a plurality of teeth or spikes. In this particular embodiment they are illustrated as teeth 67. Elements 66 are rotatably mounted on a shaft 68 and elements 66 are spaced evenly along shaft 68 as illustrated in FIG. 3, the purpose of the elements being to be lowered to the dotted position as illustrated in FIG. 1 so that the teeth 67 will penetrate the ground surface as the vehicle 10 is moved forward. Thus for scarifying, the teeth will penetrate approximately one half inch into the surface whereas for an aerating operation, the teeth will penetrate approximately two inches. To provide the means to move the elements 66 into and out of engagement with the ground surface, the shaft 68 is pivotally mounted by means of a pair of arms 69 at either end of shaft 68, arms 69 being pivotally mounted at their opposite end on a shaft 70, shaft 70 being supported in the chassis 11 on either side thereof. Shaft 68 is normally retained in a raised position. The power to move elements 66 from their raised position into their ground engaging position and back to their raised position is supplied by one or two power cylinders 75 which may be hydraulic or pneumatic as desired. Cylinders 75 are pivotally affixed to the vehicle by a shaft 76. The opposite end of the cylinders 75 are provided with a piston 77, the piston 77 being pivotally attached at its outer end or bearing end to shaft 68. Thus with the operation of the pneumatic or hydraulic cylinder 75 by hydraulic or pneumatic power (not shown), the cylinder 75 may be actuated extending piston 77 and moving shaft 68 pivotally downward which in turn moves elements 66 downward until teeth 67 engage the surface of the ground. The position of elements 66 for the desired penetration may be controlled by the extent of the outward stroke of piston 77 as illustrated in dotted lines in FIG. 1 and with the reversal of the power stroke cylinder 75, the piston 77 will lift element 66 out of engagement with the ground returning to its retracted position as illustrated in FIG. 1. It is to be noted that the vehicle as illustrated in FIGS. 1 and 2 is provided with a pair of wheels in the form of rollers 12A and 12B to carry the vehicle and with a hitch 80 to pivotally attach the vehicle to a tractor or pulling device to move the vehicle as desired. This vehicle 10 enables one man to apply each of the granular materials that may be stored in hoppers 17A–17E and in which each hopper may hold a different material either individually or in combination and in any ratio of combination by means of the calibrators as already described. This device also permits the means of spreading the granular materials evenly over a predetermined area while traversing that area and stopping the spreading of the material when the vehicle is stopped. For example, in a typical spring service of a lawn, the hoppers may be filled with the following types of material; hopper 17A may have Merion blue grass seed, hopper 17B may have blue chip fertilizer which is urea formaldyhyde, hopper 17C may be provided with a 35–5–5 fertilizer which is a 35 nitrogen, 5 potash and 5 phosphorus combination. Hopper 17D may be provided with a regular mix seed which may be 50% Merion and 50% fine fescue and hopper 17E may be provided with a pre-emergent crab grass control such as Tuper Sand. In a treatment of the lawn with the hoppers filled as above stated, there may be a maximum feed from hoppers 17A, B C and D and hopper 17E may be decreased to half or 50%. Hopper 17A may be varied, that is, the calibrator may be moved to provide anywhere from a half pound of seed per thousand square feet up to three pounds per thousand square feet as desired. This is a typical combination for a spring service treatment of a lawn. Other services or treatments of turf may be provided, for example, a single hopper such as 17A may be filled with Diazonen (insecticide) and the turf may be treated with an insecticide entirely or in part as required. It is to be noted that the material utilized in the hoppers is referred to as granular material and for proper spreading of the material it is recommended that the granules be fairly large rather than extremely small or as powder. It has been found that the larger granular material deposits better and does not drift or blow away.

A further embodiment of this invention is to provide a vehicle 10 as in the previous embodiment in which the chassis 11 extends to and is a part of a complete vehicle 10A in which the forward end of vehicle 10A is provided with a pair of steerable wheels 81–82 mounted on an axle 83 and steerable by a standard steering gear 84. Axle 83 supports the forward end of chassis 10 so that the complete vehicle is supported upon roller 12 or rollers 12A, 12B and the forward wheels 81 and 82. To make the device 10A self-propelled, a motor 90 is mounted on chassis 10 at the forward end, motor 90 driving through a clutch 91 to drive a sprocket 92, sprocket 92 driving through a chain 93 to drive a sprocket 94, sprocket 94 driving a shaft 95, shaft 95 driving a sprocket 96 and sprocket 96, through a chain 97, driving a sprocket 98 affixed to shaft 14 thus driving the vehicle by means of the rollers 12A and 12B to make the vehicle entirely self-contained.

It is to be noted that although we have described calibrators for controlling the flow of granular material from each hopper, the calibrators may also be set to provide an exact flow. For example, hopper 17A may have its calibrator set to provide one pound of granular material per thousand square feet of surface traversed. The other hoppers may have different settings for their calibrators. The hoppers may be made identical in form. Thus with a plurality of hoppers having different settings, the desired spreading or dispersion of the granular material may be predetermined and the materials loaded in the proper hoppers. However if a change in ratio is desired, one hopper may be interchanged with another hopper to provide an entirely different ratio of combinations. It is also to be remembered that, by means of the throat valve 26, any one or more hoppers may be opened or closed to provide the combination of two or more hoppers as desired. Although the granular material may be regulated in its flow by the calibrators, by changing the aperture, the flow may also be regulated by mounting the hoppers and calibrators on a lift platform or lifting device so that by regulating or by increasing or decreasing the distance between the aperture and the belt, the flow may be changed to increase or decrease the amount of granular material spread in ratio to the area traversed.

Although the vehicle is designed primarily for small granular material such as seed, the hoppers, the spout, the calibrators may be enlarged to handle larger granular material for spreading other than for the treatment of turf without departing from the spirit of this invention and although a particular number of hoppers have been shown of varying size, any number of hoppers may be utilized of the same or of varying size and although two belts have been shown as the means of transferring the granular flow to a spreader, a single belt, two belts or more may be utilized according to the hoppers necessary to provide a proper spreading and dispersion of the material retained by the hoppers without departing from the spirit of this invention and although a particular configuration has been shown for supporting the vehicle upon a roller, the vehicle may be supported in any rollable fashion or upon a second vehicle without departing from the spirit of this invention and although the vehicle has been shown in the form of a trailer and in the form of a self-propelled vehicle, any variation of the vehicle may be made without departing from the spirit of this invention and although we have shown a pneumatic or hydraulic cylinder to operate the aerator or scarifier, it is to be understood that an electric circuit and motor may be used to accomplish the same result and although we have shown a hand operated clutch adjacent the shaft to be controlled, the actuation of the clutch may be performed remotely without departing from the spirit of this invention.

What is claimed is:

1. A cart for the care and treatment of turf which includes a pair of wheels mounted in a frame and said frame provided with a hitch to connect said cart to a power pulling means, said frame supporting a plurality of containers for granular material, each container provided with a spout at the bottom, a calibrator with a bottom opening mounted below each spout, a gate valve to open to vary the opening and close said spout, a plurality of conveyor belts positioned under but in close proximity to said opening to catch the material that issues from said calibrator and control the discharge to convey the materials to a single point of deposit, a funnel shaped chute to receive said material, a spinning circular spreader to disperse said material that issues from said chute, means to drive said conveyor belts in a direct proportion to the ground traversed by said pair of wheels.

2. In a device according to claim 1 in which said wheels are rollers and said rollers are provided with a rough patterned surface to leave impressions in the ground that the rollers traverse, said impression retarding the spread of the granular material deposited thereon.

3. In a device according to claim 1 in which each spout empties into a calibrator and in which each calibrator is provided with a variable aperture to be controlled remotely to predetermine an exact amount of granular material to be spread in relation to the ground area traversed.

4. In a device according to claim 1 in which each spout empties into a calibrator and in which each calibrator is provided with a slide valve across the dispensing aperture to be variably opened to predetermine an exact amount of granular material to be spread in relation to the ground area traversed.

5. A self-propelled vehicle for the care and treatment of turf which includes four wheels mounted in a frame, a steering gear for the one pair of wheels, a motor and clutch connected to the other pair of wheels to propel said vehicle, said frame supporting a plurality of containers for granular material, each container provided with a spout at the bottom, a calibrator with a bottom opening mounted below each spout, a gate valve to open to vary the opening and close said spout, a plurality of conveyor belts positioned under but in close proximity to said openings to catch the material that issues from said calibrator and control the discharge to convey the materials to a single point of deposit, a funnel shaped chute to receive said material, a spinning circular spreader to disperse said material that issues from said chute, means to drive said conveyor belts in a direct proportion to the ground traversed by said second pair of wheels.

References Cited

UNITED STATES PATENTS

| | | | |
|---|---|---|---|
| 32,554 | 6/1861 | Badlam | 111—10 |
| 2,120,169 | 6/1938 | Baughman | 239—672 |
| 2,547,143 | 4/1951 | Speicher | 239—661 |
| 2,564,255 | 8/1951 | Haydock | 239—656 |
| 2,946,597 | 7/1960 | Simonsen | 239—656 |
| 3,220,369 | 11/1965 | Gandrud | 111—10 |

FOREIGN PATENTS 99,367  12/1961  Norway.

ABRAHAM G. STONE, Primary Examiner.

W. J. CONLON, Assistant Examiner.

U.S. Cl. X.R.

239—656